United States Patent
Kondrat et al.

(10) Patent No.: US 12,378,433 B2
(45) Date of Patent: Aug. 5, 2025

(54) AQUEOUS COATING COMPOSITION COMPRISING AN EPOXY RESIN-BASED PAINT BASE COMPONENT

(71) Applicant: BASF Coatings GmbH, Münster (DE)

(72) Inventors: Anna Kondrat, Münster (DE); Beate Rohkamp, Münster (DE); Egbert Nienhaus, Münster (DE); Karin Wever, Münster (DE); Joerg Ressel, Münster (DE); Silke Przybilla, Münster (DE); Tim Voegeling, Münster (DE); Sibylle Schoeps, Münster (DE); Monika Tiggemann, Drensteinfurt (DE); Sven Gosheger, Drensteinfurt (DE)

(73) Assignee: BASF COATINGS GMBH, Muenster (DE)

(*) Notice: Subject to any disclaimer, the term of this patent is extended or adjusted under 35 U.S.C. 154(b) by 696 days.

(21) Appl. No.: 17/634,137

(22) PCT Filed: Aug. 7, 2020

(86) PCT No.: PCT/EP2020/072236
§ 371 (c)(1),
(2) Date: Feb. 9, 2022

(87) PCT Pub. No.: WO2021/032505
PCT Pub. Date: Feb. 25, 2021

(65) Prior Publication Data
US 2022/0315792 A1   Oct. 6, 2022

(30) Foreign Application Priority Data
Aug. 20, 2019   (EP) ..................... 19192480

(51) Int. Cl.
C09D 163/00  (2006.01)
B05D 5/00    (2006.01)
B05D 7/00    (2006.01)
C09D 5/08    (2006.01)

(52) U.S. Cl.
CPC .......... C09D 163/00 (2013.01); B05D 5/005 (2013.01); B05D 7/572 (2013.01); B05D 7/576 (2013.01); C09D 5/08 (2013.01)

(58) Field of Classification Search
CPC ........ B05D 7/53–536; B05D 7/56–577; B05D 5/005; C09D 163/00–10
See application file for complete search history.

(56) References Cited

U.S. PATENT DOCUMENTS

| | | | |
|---|---|---|---|
| 5,032,629 A | 7/1991 | Hansen et al. | |
| 5,418,264 A | 5/1995 | Obloh et al. | |
| 5,539,023 A | 7/1996 | Dreischhoff et al. | |
| 6,008,314 A | 12/1999 | Collong et al. | |
| 2006/0003166 A1 | 1/2006 | Wissing et al. | |
| 2006/0222875 A1* | 10/2006 | Sormani | C08G 18/4277 525/123 |
| 2012/0308729 A1* | 12/2012 | Fischer | C08G 59/182 523/400 |
| 2014/0329055 A1* | 11/2014 | Berry | B64C 1/38 427/259 |
| 2015/0059617 A1 | 3/2015 | Hepworth et al. | |

FOREIGN PATENT DOCUMENTS

| | | | | |
|---|---|---|---|---|
| CN | 106833289 A | * | 6/2017 | ............... C08K 3/04 |
| EP | 0387418 A2 | | 9/1990 | |
| EP | 0523610 A1 | | 1/1993 | |
| EP | 0610787 A2 | | 8/1994 | |
| EP | 3381958 A1 | | 10/2018 | |
| WO | 1997049749 A1 | | 12/1997 | |
| WO | 2016106346 A1 | | 6/2016 | |
| WO | 2018175730 A1 | | 9/2018 | |
| WO | WO-2021032612 A1 | * | 2/2021 | ............. C08G 59/50 |

OTHER PUBLICATIONS

Partial machine translation of CN-106833289-A (Year: 2017).*
International Search Report and Written Opinion for corresponding PCT/EP2020/072236 mailed Oct. 15, 2020, 8 Pages.
European Search Report for EP Patent Application No. 19192480.2, Issued on Feb. 21, 2020, 3 pages.

* cited by examiner

*Primary Examiner* — Kregg T Brooks
(74) *Attorney, Agent, or Firm* — Armstrong Teasdale LLP

(57) ABSTRACT

Described herein is a specific aqueous two-component coating composition including an epoxy resin-based paint base component (1), and a polyamine-based curing component (2), where the paint base component (1) includes at least one aqueous dispersion of at least one pigment (P) and/or filler (F) in at least one epoxy resin (E), where the at least one epoxy resin (E) has (i) a maximum sedimentation rate of not more than 17,500 micrometers per hour and a glass transition temperature of less than 0° C., or (ii) a maximum sedimentation rate of at least 12,500 micrometers per hour and a glass transition temperature of at least 0° C.

4 Claims, No Drawings

AQUEOUS COATING COMPOSITION COMPRISING AN EPOXY RESIN-BASED PAINT BASE COMPONENT

CROSS-REFERENCE TO RELATED APPLICATIONS

This application is a U.S. National Phase Application of International Patent Application No. PCT/EP2020/072236, filed Aug. 7, 2020, which claims priority to European Patent Application No. 19192480.2, filed Aug. 20, 2019, the entire contents of which are hereby incorporated by reference herein.

The present invention relates to an aqueous coating composition comprising a specific epoxy resin-based paint base component and a polyamine-based curing component. The coating composition is of excellent suitability as aqueous sanding surfacer or primer-surfacer. Accordingly, by application to a substrate and subsequent curing of the coating composition, it is possible to obtain a surfacer layer having excellent adhesion and corrosion resistance. More particularly, however, what are obtained are surfacer layers that have excellent surface quality and especially barely any visual defects, for example holes, or are even entirely free of such defects. In this way, it is ultimately possible to obtain overall paint system structures that have correspondingly excellent optical quality. In addition, the surfacer layers have excellent sandability and hence very good usability especially in the repair sector.

STATE OF THE ART

Aqueous surfacers and primer-surfacers that are curable on the basis of epoxy-amine combinations and are able in this way to form corrosion-stable surfacer layers or primer-surfacer layers are known in principle. Their profile of properties is quite complex and has the particular features of the corrosion stability already mentioned and good adhesion to various substrates such as steel, galvanized steel, aluminum, electrocoats and old paint systems.

It is a further important property of these systems that surfacer layers that are constructed in the automotive refinishing sector should have acceptable sandability even after curing at moderate temperature and within processing times customary in paint shops. This sandability is of high importance in the process sequence of painting in order to create a homogeneous surface for the layers such as basecoat and clearcoat that then follow and ultimately to enable an esthetically high-quality appearance of the painted surface.

However, it should be noted that it is additionally important for this esthetic appearance that the surfacer layer as such is very substantially free of visual defects such as holes. It is exactly here that the prior art systems regularly have weaknesses.

WO 97/49749 A1 discloses coating compositions based on aqueous epoxy systems comprising particular epoxy-aminourethane adducts as curing agent. These are obtained by reacting very specific aminourethane compounds with epoxy compounds. The epoxy compounds are obtained by reacting polyalkylene polyethers with one or more amino groups. These adducts are used in aqueous two-component paints, especially automotive paints. The paints or paint coats produced therefrom have good sandability. It is stated that the paints described in EP 0 387 418 A2 have disadvantages with regard to their sandability.

EP 0 387 418 A2 discloses a curing agent for epoxy compounds and the use thereof for production of coatings and coverings. The curing agent is prepared by reacting polyalkylenepolyetheramines with a stoichiometric excess of di- and/or polyepoxy compounds and then reacting the aforementioned adduct with a stoichiometric excess of amines. The coating compositions produced with these curing agents have good storage stability and good curing properties. There is no mention of refinishing, nor of the sandability of coatings or the use of the curing agents in surfacers.

EP 0 610 787 A2 describes a curing agent for aqueous epoxy resin dispersions, obtained by reacting an adduct (A) of polyepoxide and polyalkylene polyether polyol with a reaction product of an amine and an epoxide or an amine and subsequent reaction with an epoxide, where the amine is used in a stoichiometric excess in each case. The problem addressed is, for example, that of obtaining good bonding and hardness in coating compositions including surfacers.

EP0523610 A1 describes an epoxide/amine-based coating composition which, after application, produces smooth, faultless surfaces. This is achieved through the use of a polyurethane resin in the coating composition.

US 2006/0003166 A1 describes a composition for the production of primers and/or surfacers that is likewise epoxide/amine-based. The use of this composition enables the construction of coating layers that have good resistance to sagging. This is achieved through the use of a specific polyamine component.

Problem and Technical Solution

The problem addressed by the present invention was accordingly that of eliminating the disadvantages of the prior art and providing an aqueous coating composition which, after application and curing, especially in the context of automotive refinishing, has good bonding, anticorrosion and possibly sandability properties and additionally has excellent surface quality without surface defects such as holes. The composition was thus to have particularly good suitability as surfacer and primer-surfacer or for production of the surfacer layer in a multicoat paint system.

It has been found that said objects were achieved by a novel aqueous two-component coating composition comprising
(1) an epoxy resin-based paint base component, and
(2) a polyamine-based curing component,
wherein the paint base component (1) comprises at least one aqueous dispersion of at least one pigment (P) and/or filler (F) in at least one epoxy resin (E),
and wherein the at least one epoxy resin (E) has
(i) a maximum sedimentation rate of not more than 17 500 micrometers per hour (measured in an optical cuvette centrifuge at an acceleration of 2050 g, solids diluted to 30% with water) and a glass transition temperature of less than 0° C. (measured by means of dynamic differential calorimetry, heating rate 10 K/min, 2nd measurement run), or
(ii) a maximum sedimentation rate of at least 12 500 micrometers per hour and a glass transition temperature of at least 0° C.

The new aqueous two-component (2K) coating composition is subject matter of the present invention and is also referred to as coating composition of the invention. The present invention also provides a process for producing a cured coating on a substrate using the coating composition. The present invention likewise provides a process for repairing a multilayer paint system having defects using the coating composition. Also provided by the present invention are a coating layer produced as described and a coated substrate.

It has been found that, surprisingly, only use of the specific epoxy resins (E) in the paint base component for dispersion of pigments and/or fillers results in a coating composition that can both be produced appropriately using standard means of dispersion and grinding (i.e. especially without rheological degradation processes in the mill that lead to a paint that can be processed only with difficulty, if at all) and, after application and curing, result in a paint layer which has excellent performance properties and is additionally very substantially free of holes. The use of other epoxy resins in some cases does not even enable appropriate production of the paint base component by the necessary dispersion, or else, if dispersion was possible, leads to paints having very poor performance properties. The use of the necessary polyamine components corresponding to the epoxy resins for dispersion in the paint base component leads to paints having properties that are acceptable in principle, but has the disadvantage that the paint has numerous microscopic holes.

DETAILED DESCRIPTION

Aqueous Resin Dispersion (AD) for Use with Preference

The coating composition of the invention preferably contains a specific aqueous dispersion (AD) comprising a resin component (R).

The term "aqueous" in connection with dispersions such as resin dispersions, phases or else aqueous coating compositions is known in principle. What is meant is a dispersion or mixture containing a significant proportion of water as solvent. It will be appreciated that it is alternatively possible for aqueous systems to contain organic solvents in at least minor amounts, for example as cosolvents with an emulsifier function for stabilization of particular constituents such as resins, pigments or additives. "Aqueous" in the context of the present invention should preferably be understood to mean that the system in question, especially the dispersion, has a proportion of at least 40% by weight, preferably at least 50% by weight, even more preferably at least 60% by weight, of water, based in each case on the total amount of the solvents present (i.e. water and organic solvents). Preferably in turn, the proportion of water is 50% to 99% by weight, especially 60% to 98% by weight, based in each case on the total amount of the solvents present.

Resin or resin component is likewise understood to mean, in accordance with the definition known in principle, a product that contains organic constituents, namely organic reaction products, oligomers and/or polymers, and if appropriate, like the resin component (R), monomers as well. Resins have a more or less broad distribution of molar masses and are generally usable as binders in coating compositions. They thus form at least a proportion of the polymeric network of a coating layer present after curing.

The resin component (R) contains at least one di- and/or polyfunctional monomeric primary and/or secondary amine (M), i.e. at least one monomeric amine comprising at least two amino groups selected from the group of the primary and secondary amino groups. It is of course not impossible for tertiary amino groups additionally to be present.

In the context of the resin component (R), it is essential that the amines (M) used overall and hence present in the aqueous dispersion (AD) consist at least to an extent of 65 mol % of amines consisting of amino groups and hydrocarbon units. What this means is thus that other functional groups in particular, for example hydroxyl, carboxyl or nitrile groups, are present only in minor amounts. It is preferable that the amines (M) consist to an extent of at least 75 mol %, more preferably to an extent of at least 90 mol %, of amines consisting of amino groups and hydrocarbon units. Most preferably, the proportion of these amines is 100 mol %.

The proportion of corresponding amines is basically self-explanatory from the amounts of the amines used. In the case of use of products such as commercial products, however, it is equally possible by analysis of the products (in which amines may also already be partly or entirely covalently bonded to one another) to determine the proportion of corresponding amines to such an extent that it is directly clear that the abovementioned conditions are fulfilled (analysis, for example, via gas chromatography (GC), mass spectrometry (MS)).

Examples of suitable amines (M) are the monomeric aliphatic amines, aromatic amines and araliphatic (mixed aliphatic-aromatic) amines that are known in principle to the person skilled in the art.

Examples of di- and/or polyfunctional monomeric primary and/or secondary amines include the following: ethylenediamine, propylene-1,2-diamine, propylene-1,3-diamine, butane-1,4-diamine, octane-1,8-diamine, 1,3-diaminopentane, hexamethylenediamine, 2-methylpentamethylenediamine, neopentanediamine, cyclohexanediamine, 2,2,4-(2,4,4-)trimethylhexamethylenediamine, isophoronediamine, bis(aminomethyl)cyclohexane, bis(4-am inocyclohexyl)methane, diethylenetriamine, triethylenetetramine, tetraethylenepentamine, dipropylenetriamine, bis(hexamethylenediamine), N,N-dimethylaminodipropylenetriamine, laurylpropylenediamine, 1,2- and 1,3-(m)-xylylenediamine and 1,4-bis(aminomethyl) benzene. Further amines include aminoethylethanolamine or else heterocyclic polyamines such as aminoethylpiperazine and bis(aminopropyl)piperazine.

Preference is given to difunctional primary and/or secondary amines (M), and preference again to difunctional primary amines. Very particular preference is given to isophoronediamine and m-xylylenediamine, and the resin component more preferably contains a mixture of the two diamines mentioned. What is meant is thus that the amines (M) are a mixture of isophoronediamine and m-xylylenediamine.

The proportion of the at least one di- and/or polyfunctional monomeric primary and/or secondary amine (M), based on the resin component (R) is 5% to 15% by weight, preferably 6% to 14% by weight, more preferably 7% to 13% by weight (for test method see examples section).

As apparent from the synthesis method of stages (A) and (B) which is described in more detail hereinafter, in stage (A), a di- and/or polyfunctional monomeric primary and/or secondary amine (M) as described above (referred to as component (Ib) in stage (A)) as reactant for the reaction with an epoxy-functional resin mixture (Ia) is partly reacted and, in stage (B), reacted further with a further epoxy compound (IIb) in an aqueous phase. The ultimately resulting resin component (R) then contains a proportion as described above of the at least one di- and/or polyfunctional monomeric primary and/or secondary amine (M). It is accordingly apparent that the proportion of the monomeric amine (M) in the resin component (R) is the residual proportion of the amine (M) used originally in stage (A) for the reaction.

The resin component (R) also contains polyfunctional polymeric organic amines having primary and/or secondary amino groups. By delimitation from the monomeric amines already described, these are thus specifically not low molecular weight compounds having a discrete number of amino groups per molecule which is constant for each molecule, but are adducts or reaction products that have polymeric character and wherein the number of amino groups per molecule can be described solely by way of averages.

At this point too, the structure of the components described here, namely that of the polyfunctional polymeric organic amines having primary and/or secondary amino groups, is apparent from the synthesis method of stages (A) and (B) which is described in more detail hereinafter. The starting compounds described for preparation of the resin component (R) show what kind of structural units are possessed by the polyfunctional amines mentioned here.

The resin component (R) has an N—H equivalent of 150 to 400 g/mol, preferably 160 to 350 g/mol, more preferably 170 to 250 g/mol (for method of determination see examples section).

The aqueous dispersion (AD) comprising the resin component (R) is preparable by a two-stage process (A+B). It will be immediately apparent to the person skilled in the art that adequate description of the dispersion via purely structural features and/or features of the dispersion that are based on parameters is very difficult, and the specification of reaction steps and sequence thereof is sensible for this purpose. It is consequently also apparent from this that the reaction sequence described below has a direct influence on the structure of the resin component (R) and hence the dispersion (AD).

Stage A

In a first stage (A) of the reaction sequence, two starting components (Ia) and (Ib) are reacted with one another, namely an epoxy-functional resin mixture (Ia) and a component (Ib) containing at least one di- and/or multifunctional monomeric primary and/or secondary amine (M). This gives rise to an amino-functional resin mixture (I). It is accordingly apparent that the amounts of components (Ia) and (Ib) are matched to one another such that the N—H equivalents of component (Ib) are in a molar excess relative to the epoxy groups of component (Ia).

The epoxy-functional resin mixture (Ia) contains, in interreacted form, two components (Ia1) and (Ia2) that are described hereinafter. The resin mixture (Ia) preferably consists of these two components, i.e. is prepared by reaction solely of these two components.

Component (Ia1) is at least one di- and/or multifunctional organic epoxy compound.

Useful components (Ia1) are accordingly the epoxy resins known in principle. It is preferable that these epoxy compounds used have an average epoxy equivalent weight of less than 400 g/mol. It has been found that a correspondingly low average epoxy equivalent weight and hence a higher epoxy functionality of this component leads to better sandability again in the surfacer layer to be ultimately produced. More preferably, the average epoxy equivalent weight is less than 350 g/mol, preferably less than 300 g/mol, more preferably less than 250 g/mol. The average epoxy equivalent weight can be obtained via the determination of the epoxy equivalent of all epoxy compounds used (for test method see examples section) and weighting of the proportions by mass thereof in the total weight of the epoxy compounds. It is likewise possible, when using existing products such as commercial products (in which the epoxy compounds may already be covalently bonded), by analysis of the products, to determine the average epoxy equivalent weight to the extent that it is immediately clear that it is below the abovementioned upper limits (analysis, for example, via gas chromatography (GC), mass spectrometry (MS)).

Epoxy resins are known to be polycondensation resins containing more than one epoxy group on statistical average in the base molecule. For example, these are epoxy resins prepared by condensation of bisphenol A or bisphenol F with epichlorohydrin. These compounds contain hydroxyl groups along the chain and epoxy groups at the ends. According to the chain length of the epoxy resins, there is a change in the crosslinking capacity via the epoxy groups since precisely that crosslinking capacity via the epoxy groups falls with rising chain length/molar mass. It is ultimately possible to use any epoxy resins known per se to the person skilled in the art, provided that they are within the abovementioned epoxy equivalent weight range. For example, it is possible to use the commercially available epoxy resins that are mentioned further down, which can be obtained as a solution or dispersion in organic solvents or water.

Such epoxy resins can be obtained, for example, as 100% systems or else solutions or dispersions in organic solvents or water, for example under the Beckopox EP trade name from Allnex (or under the Epikote/EPI-REZ trade name from Hexion/Araldite in the Huntsman group).

It is preferable that component (Ia1) is an epoxy compound which is difunctional on average, since this is what forms via epichlorohydrin in the abovementioned standard synthesis.

It is additionally preferable that the epoxy compound (Ia1) is a bisphenol A-based epoxy compound, i.e. an epoxy compound that has been prepared via the use of bisphenol A. More particularly, this means that the epoxy compound does not contain any bisphenol F introduced via the synthesis. It has been found that the result of this in turn is a positive influence on the sandability of the surfacer layer to be ultimately produced.

Component (Ia2) is at least one compound X—R where X is a functional group reactive toward epoxy groups and R is an organic radical containing polyoxyalkylene units and not containing any further X groups. Preference is given to using exactly one compound X—R as component (Ia2).

The X groups are the groups known to those skilled in the art, for example primary or secondary amino groups, hydroxyl groups, carboxyl groups or thiol groups.

It is crucial that the compound X—R has just one X group. Otherwise, an adverse effect is found on the sandability of the surfacer layer to be ultimately produced.

Preferred X groups are amino groups, and among those preferably primary amino groups. Aside from the good reactivity of amino groups with epoxy groups, the primary amine has two N—H equivalents and hence linkage sites to epoxides. In this way, incorporation of the compound X—R into a side chain position of the molecule can take place. The overall result of this in turn is advantages for the sandability of the surfacer layer.

The R group is an organic radical containing polyoxyalkylene units, especially preferably polyethylene or polypropylene units or mixed polyethylene/polypropylene units. It is preferable that the organic R radical, apart from any molecular units resulting from the synthesis, consists of polyoxyalkylene units. For the sake of simplicity, such R groups are also referred to as polyoxyalkylene groups. Molecular units that result from the synthesis are, for example, organic radicals of molecules that are used at the start of the formation of a polyoxyalkylene chain, for example a starter alcohol by means of which the polymerization of ethylene oxide and/or propylene oxide is initiated.

Preferably, the R group is a polyethylene group, a polypropylene group or a mixed polyethylene/polypropylene group.

The weight-average molecular weight of the compound (Ia2) may vary widely and is, for example, in the range from 800 to 2200 g/mol (determined by means of coupling of size exclusion chromatography with light scattering).

The compounds X—R mentioned may be prepared themselves or else obtained commercially. For example, the obviously preferred polyoxyalkylenemonoamines can be purchased from Huntsman under the "Jeffamine" trade name.

The epoxy-functional resin mixture (Ia) contains, in inter-reacted form, the two components (Ia1) and (Ia2). Accordingly, the epoxy groups of component (Ia1) and the X groups of component (Ia2) are thus reacted with one another. Corresponding reaction regimes and conditions are known to those skilled in the art and do not require any further mention.

Component (Ia) is an epoxy-functional resin mixture. It is thus apparent from the feedstocks described that components (Ia1) and (Ia2) are used in such a way that the epoxy groups of component (Ia1) are in a molar stoichiometric excess relative to the reactive units of the X groups. The number of reactive units means the number of potential linkage sites for each epoxy group. For a hydroxyl group or secondary amino group, there is, for example, one reactive unit per X group. For primary amino groups, there are two reactive units (two N—H functions). Preferably, the molar ratio of the epoxy groups of compound (Ia1) and the epoxy-reactive units of the X groups of component (Ia2) is from 10 to 1.1, more preferably 5 to 1.5, especially preferably from 3.5 to 1.8.

The amount of epoxy groups in component (Ia1) can be obtained or adjusted appropriately to the purpose in a known manner by determining the epoxy equivalent weight. The amount of reactive units in the X groups is found from the test methods known per se for determining the amount of functional X groups, for example by the determination of the amine number, the OH number or acid number (DIN 53176: 2002-11, DIN 53240-3:2016-03, DIN EN ISO 2114 Correction 1: 2006-11).

Component (Ia) preferably has an epoxy equivalent weight of 500 to 1500 g/mol, more preferably 600 to 1200 g/mol.

Component (Ib) to be reacted with component (Ia) comprises at least one di- and/or multifunctional monomeric primary and/or secondary amine (M). Preferably, component (Ib) consists of at least one such amine (M).

Examples of suitable amines (M) have already been described above as a constituent of the resin component (R). All the remarks made there and also preferred variants are correspondingly applicable to the amines in component (Ib).

The resin mixture (I) is an amino-functional resin mixture, the preparation of which thus requires, in relation to the functional groups of components (Ia) and (Ib) to be reacted with one another, a molar excess of the N—H equivalents. Specifically, the NH equivalent of the resin mixture (I) is from 50 to 140 g/mol, preferably 70 to 130 g/mol (for method of determination see examples section). Moreover, the resin mixture (I) comprises a proportion of 17.5% to 40% by weight, preferably 25% to 35% by weight, of di- and/or polyfunctional monomeric primary and/or secondary amines (M), i.e. component (Ib). Both criteria can be adjusted by the person skilled in the art by suitable choice of the molar amounts of the two components and in the knowledge that there is quantitative conversion of epoxy groups and N—H functions under the conditions and reaction regimes that are known per se. In addition, the examples below give a more specific overview again. Possible reaction regimes and corresponding conditions are known to those skilled in the art and do not require any further mention. Preferably, the resin mixture (I), after its production, is in dispersion in water and in that case is in aqueous dispersion.

The resin mixture (I) can as such be produced as described above and hence obtained in aqueous dispersion. It is likewise possible to commercially purchase an aqueous dispersion of a resin mixture (I) (for example as Beckopox VEH 2849w/80WA (from Allnex)).

Stage B

In a second stage (B) of the reaction sequence, two starting components (IIa) and (IIb) are reacted with one another in the aqueous phase, namely a component (IIa) containing the amino-functional resin mixture (I) and a component (IIb) containing at least one di- and/or multifunctional organic epoxy compound having an average epoxy equivalent weight of less than 400 g/mol, preferably less than 350 g/mol, more preferably less than 250 g/mol. Optionally after removal of organic solvents used, this gives rise to the aqueous dispersion (AD) comprising a resin component (R). It is apparent from the properties of the resin component (R) that have already been mentioned in detail above that the amounts of components (IIa) and (IIb) are matched to one another such that the N—H equivalents of component (IIa) are in a molar excess relative to the epoxy groups of component (IIb).

Preference is given to using, as component (IIa), the direct reaction product from stage (A) that has been supplemented merely optionally with solvents or auxiliaries such as emulsifiers. This is because the resin mixture (I) is obtained as an aqueous dispersion after stage (A) and can thus be used directly in stage (B) that takes place in the aqueous phase. Component (IIa) preferably does not contain any further constituents that can be reacted with component (IIb) aside from the reaction product mentioned.

Component (IIb) preferably consists of at least one, preferably exactly one, di- and/or multifunctional organic epoxy compound having an epoxy equivalent weight that meets the abovementioned prerequisites. Examples of suitable epoxy compounds are those already described above as component (Ia1). All the remarks made there and also preferred variants are correspondingly applicable to the epoxy compounds in component (IIb).

The aqueous dispersion (AD) has, for example, a solids content of 25% to 45% by weight (for test method see examples section).

Process for Producing the Aqueous Dispersion (AD)

The above description obviously also results in a process for producing the aqueous dispersion (AD). All the essential and preferred features of the process regime that are described above are evidently also applicable to this production process.

Aqueous Two-Component (2K) Coating Composition

The aqueous coating composition of the invention is a two-component coating composition.

As is known, such a 2K composition means that a component (1) as defined in more detail further down (paint base component) and a component (2) as defined below (curing component) are prepared and stored separately from one another and are not combined until shortly before application. The processing time or pot life (i.e. the time within which the coating composition can be processed at room temperature (15 to 25° C., especially 20° C.) without the increase in viscosity, as a result of corresponding crosslinking reactions at room temperature, for example, being so severe that application is no longer possible) is dependent, as is known, on the constituents used in components (1) and (2). In the context of the present invention, the processing time of the coating composition is preferably at least 2 min up to 60 min, more preferably at least 5 min up to 60 min. The particular advantage of such a two-component coating composition is that, in particular, no high temperatures are needed for curing. Preference is given to curing the coating composition of the invention after application to a substrate at not more than 80° C., especially preferably not more than 65° C.

Curing means the process known to the skilled person, in other words the conversion of a coating composition, applied as a film to a substrate, into the ready-to-use state, in other words, therefore, into a state in which the substrate provided with the coating in question can be put to its intended use. In connection with the problem that is likewise of relevance in relation to refinishing and has been addressed in the context of the present invention, namely the obtaining of good sandability, exactly that sandability and subsequent overcoatability are of course criteria for intended use. The curing is especially effected by chemical reaction of reactive functional groups of binder constituents present in the different components (1) and (2) of the coating composition. Particular mention should thus be made, in the context of the present invention, of the reaction of the amino groups or N—H functions of a polyamine component in the polyamine-based curing component (2) and the epoxy groups of the at least one epoxy resin (E) in the paint base component (I) of the 2K coating composition of the invention. As a result of these crosslinking reactions and of the parallel evaporation of any organic solvents and/or water present, a coating film is formed—that is, a cured coating layer (cured coating) is produced. Activation of the reactions is possible by means of thermal energy, although in the case of the present invention there is the above-described advantage of high temperatures not being necessary.

The term "binder" or "binder constituent" refers herein, in accordance with the relevant DIN EN ISO 4618, to the nonvolatile fraction of a coating material, excluding pigments and fillers. Specific binder constituents in this context are, as well as the epoxy resins (E), also the polyamine component already mentioned above or else coatings additives.

Merely for the sake of clarity, however, the term "binder" is used primarily in relation to the resin components of the paint base component (1), i.e. of the epoxy resin (E) in particular, that are responsible for film formation, whereas the polyamine component present in the curing component (2) is referred to primarily as curing agent or else crosslinking agent.

It is likewise known that the paint base component (1) regularly contains, as well as the binder and solvents, all or the vast majority of further functional constituents of the composition, for example pigments, fillers and additives, whereas the curing component (2), aside from solvents and any additives present, contains solely the component intended for crosslinking. The terms "paint base component" and "curing component" in connection with 2K coating compositions are known to the person skilled in the art and also have essence-characterizing and hence delimiting character within a certain scope of configuration. It is essential in the context of the present invention that the paint base component contains pigments and fillers, preferably all pigments and fillers that are used in the respective coating composition.

Of course, for completion of a 2K coating composition, there may also be at least one further additional main component. This means that, as well as the paint base component (1) and the curing component (2), further constituents such as solvents or additives may be added in at least one further main component, for example after the two main components (1) and (2) have been added. However, the composition is nevertheless by definition a 2K coating composition since the number of components containing the constituents to be crosslinked with one another that are responsible for the film formation is two.

The 2K coating composition is of excellent suitability as surfacer and primer-surfacer and usable as such. Accordingly, the 2K coating composition is preferably a surfacer or primer-surfacer. The function, configuration and field of use of surfacers and primer-surfacers are known in principle to the person skilled in the art and in that respect have delimiting character. A surfacer is generally applied in the context of automotive OEM finishing as an interlayer (to the previously cured electrocoat), cured separately and then overcoated with basecoat and clearcoat. Primer-surfacers find use especially in the automotive refinishing sector, where they are responsible for filling locally damaged areas in the original paint system and for obtaining appropriate adhesion on the substrate and assurance of corrosion protection.

The 2K coating composition comprises an epoxy resin-based paint base component that comprises an aqueous dispersion of at least one pigment (P) and/or filler (F) in at least one epoxy resin (E). The paint base component may of course also consist of said dispersion.

It is known in principle that pigments and fillers are used in coating compositions in the form of a dispersion. This means that the production of the coating composition comprises a step in which pigments or fillers are dispersed with resins and generally solvents such as water with introduction of high shear forces in mills or dissolvers and hence converted to a dispersion. The resins here have a dispersing or emulsifying effect and merely promote the stabilization of the pigments or fillers. For further assistance of dispersion, it is of course also possible to use further additives. It is likewise possible that the production of the dispersion comprises the addition of all paint constituents to be introduced into the paint base component, such that the paint base component thus ultimately consists of the dispersion.

A dispersion is thus a mixture that contains at least (but not necessarily exclusively) resins and pigments and/or fillers in a mutually dispersed form.

In the context of the present invention, it is essential that the dispersion contains a specific epoxy resin as resin component used for dispersion. Only in this way is a 2K coating composition obtained which, as well as the properties to be achieved in principle, such as bonding and corrosion protection, additionally enables, after application and curing, a coating layer free of visual defects such as holes. More particularly, it has been found that a dispersion operation conducted as in the prior art in the polyamine component does not lead to this excellent optical quality. It was even more surprising that said objective was achievable only with the specific epoxy resins (E). This is because the production of a dispersion in different epoxy resins, from a technical point of view, was either not possible at all since irreversible thickening or solidification of the mixture to be dispersed occurred as a result of rheological degradation, such that the production of a coating composition was no longer possible, or else the degradation processes did permit the formulation of a paint, but one that had very poor performance properties after application and curing. Moreover, in this scenario, the cleaning of the dispersion unit was extremely difficult, and so the process was industrially unusable.

The fact that the paint base component contains or consists of a dispersion thus means that either a dispersion is produced as described above and then is completed with the further paint constituents still absent to produce the paint base component (for example using standard stirring equipment), or else, in the case of production of the dispersion, all constituents of the paint base component are introduced into the dispersion process and hence the dispersion constitutes the paint base component.

The fact that the dispersion is aqueous does of course mean that it contains water as solvent and, preferably, water is also used in the actual dispersion process. An exact definition of "aqueous" can be found further up.

It is preferable that the dispersion comprises all pigments and/or fillers that are to be used in the coating composition. It is likewise preferable that the dispersion comprises no other epoxy resins aside from the at least one epoxy resin (E). It is preferable again that the epoxy resins (E) account for at least 90% by weight, preferably at least 95% by weight, of the binder component of the dispersion. The binder component results from the solids (nonvolatile component) of the dispersion minus the proportion of pigments and fillers.

The 2K coating composition contains at least one specific epoxy resin (E) in the paint base component (1) or in the aqueous dispersion. The paint base component (1) and hence the coating composition of the invention as well preferably does not contain any other epoxy resins aside from the epoxy resins (E). The epoxy groups can react with the N—H functions of the polyamine component present in the curing component (2), after mixing of the two main components (1) and (2), to form network structures and in this way contribute to curing of a coating layer produced from the coating composition.

Epoxy resins are known in principle and are also described further up in connection with components (Ia1) and (IIb). Accordingly, these are polycondensation resins containing more than one epoxy group on statistical average in the base molecule. For example, these are epoxy resins prepared by condensation of bisphenol A or bisphenol F with epichlorohydrin. These compounds contain hydroxyl groups along the chain and epoxy groups at the ends. Corresponding epoxy resins can be obtained commercially, for example, as 100% systems or solutions/dispersions in organic solvents or water.

In relation to the epoxy resins (E), particularly important features that are essential to the invention should be noted.

It is essential to the invention that the epoxy resins (E) have
(i) a maximum sedimentation rate of not more than 17 500 micrometers per hour (measured in an optical cuvette centrifuge at an acceleration of 2050 g, solids diluted to 30% with water) and a glass transition temperature of less than 0° C. (measured by means of dynamic differential calorimetry, heating rate 10 K/min, 2nd measurement run), or
(ii) a maximum sedimentation rate of at least 12 500 micrometers per hour and a glass transition temperature of at least 0° C.

Surprisingly, it is possible exclusively via this combination of properties, via the above-described dispersion operation, to provide a paint base component (1) and ultimately also a coating composition that combines the properties named with one another, and especially leads to a very good optical quality of a coating layer produced therefrom that does not contain any surface defects such as holes.

In a preferred embodiment, the epoxy resins have
(i) a maximum sedimentation rate of 2500 to 17 500 micrometers per hour and a glass transition temperature of −30° C. to less than 0° C., or
(ii) a maximum sedimentation rate of 12 500 to 30 000 micrometers per hour and a glass transition temperature of 0° C. to 20° C.

Particularly preferred variants are described as follows:
Maximum sedimentation rates of 10 000 to 17 500 micrometers per hour and glass transition temperature of −30° C. to −10° C.,
Maximum sedimentation rates of 10 000 to 17 500 micrometers per hour and glass transition temperature of 0° C. to 20° C.

It is preferable that the epoxy equivalent of the epoxy resins (E) is less than 500 g/mol, preferably less than 350 g/mol, more preferably less than 300 g/mol and especially preferably less than 250 g/mol (for test method see examples section). Ranges preferred among these are from 100 to 500 g/mol, more preferably 150 to 250 g/mol.

It is preferable that the epoxy resins are used in the form of aqueous dispersions that optionally additionally contain small proportions of organic cosolvents. Such epoxy resin dispersions are, for example, commercially available (see also examples).

The proportion of the at least one epoxy resin (E), based on the solids content of the coating composition, is, for example, 15-40% by weight, more preferably 20-30% by weight. If the at least one epoxy resin is used in the form of a dispersion, for example, the amount of the dispersion used, taking account of the dispersion solids, is adjusted in accordance with the desired amount of resin.

The 2K coating composition contains, as an obligatory constituent, a polyamine-based curing component (2), i.e. a curing component containing a polyamine component. Such polyamine components and their use in epoxy/amine-based 2K coating compositions are known in principle. These are mixtures of polymeric and optionally monomeric polyamines that contain primary and/or secondary amino groups and can enter into crosslinking reactions via the N—H functions that are accordingly present with the epoxy groups of the epoxy resins that are likewise present (here at least epoxy resins (E)).

Such polyamine components have, for example, an N—H equivalent of 50 to 500 g/mol, preferably 100 to 400 g/mol, more preferably 150 to 300 g/mol (for method of determination see examples section).

In principle, in the context of the present invention, it is possible to use any of the polyamine components known to the person skilled in the art in this regard. In a variant of the present invention which is not essential to the invention but is preferred, a specific polyamine component described in more detail further up, namely a resin component (R) present in an aqueous dispersion (AD), is used in the curing component (2).

Preferably, the molar ratio of the N—H functions of the polyamine component in the resin component (2) and the epoxy groups in the epoxy resins in the paint base component (1) is between 0.7:1 and 0.95:1, for example 0.9:1.

The 2K coating composition is aqueous, i.e. contains at least water as solvent. An exact definition of "aqueous" can already be found further up.

The 2K coating composition additionally contains pigments and/or fillers.

Preferred pigments are black and/or white pigments. The primer thus preferably contains at least one black pigment or at least one white pigment or at least one white pigment and one black pigment. This means that the primer of the invention preferably has a black, white or (in various gradations) gray color. It is of course not impossible for further pigments to be present as well.

Preferred black pigments are the typical organic and inorganic, especially inorganic, black pigments as commercially available in powder form. Particular mention should be made of pigment blacks (carbon blacks), iron oxide (Fe3O4) pigments such as the typical synthetic iron oxides (available, for example, under the Bayferrox trade name from Lanxess), mixed oxide pigments such as manganese black or spinel black. Very particular preference is given to pigment blacks (carbon blacks) and iron oxide pigments.

Preferred white pigments are the typical inorganic white pigments, for example titanium dioxide (for example the rutile pigments known by the Kronos trade name from Kronos), zinc oxide, zinc sulfide or antimony trioxide. Very particular preference is given to titanium dioxide, especially in its rutile modification.

Further preferred pigments are the pigments known by the umbrella term "anticorrosion pigments". Particular preference is given here to zinc phosphate. Even though zinc phosphate has a white color, it is not classified as a white pigment but as an anticorrosion pigment owing to its anticorrosive effect.

The proportion of the pigments is preferably 15-25% by weight, especially 20% by weight, based in each case on the solids content of the coating composition.

Fillers present with preference are all inorganic and organic fillers that are known per se and familiar to the person skilled in the art, preferably inorganic fillers. The fillers thus especially include the substances known to those skilled in the art that are used, for example, in granular form or in powder form for attainment of particular physical properties of coating compositions and are insoluble in the respective use medium. These especially include carbonates such as calcium carbonate or barium carbonate, sulfates such as calcium sulfate and barium sulfate, silicates and sheet silicates such as talc, pyrophyllite, mica, kaolin, precipitated calcium silicates, aluminum silicates, calcium/aluminum silicates, sodium/aluminum silicates and mullite, silicas such as quartz, cristobalite, precipitated silicas or especially fumed silicas as obtainable, for example, under the Aerosil trade name (from Evonik), metal oxides and hydroxides, for example aluminum hydroxide and magnesium hydroxide.

The proportion of the fillers is preferably 30-50% by weight, especially 30-40% by weight, based in each case on the solids content of the coating composition.

In addition, the coating composition may also contain at least one additive. Examples of such additives are light stabilizers, antioxidants, deaerating agents, emulsifiers, slip additives, polymerization inhibitors, adhesion promoters, leveling agents, film-forming auxiliaries, thickeners, sag control agents (SCAs) or corrosion inhibitors. They are used in the customary and known amounts. The same applies to the possible use of organic solvents, but the amount thereof is chosen such that they do not alter the aqueous character of the coating composition.

The solids content of the 2K coating composition may vary according to the requirements of the individual case, but is preferably in the region of 70-85% by weight. The solids content is guided primarily by the viscosity required for application, more particularly for spray application, and so may be adjusted by the skilled person on the basis of his or her general art knowledge, optionally with assistance from a few exploratory tests.

The 2K coating composition can be produced using the mixing methods and mixing units that are customary and known for the production of coating compositions, such as stirred tanks, stirred mills, extruders, kneaders, Ultraturrax, in-line dissolvers, static mixers, toothed ring dispersers, expansion nozzles and/or microfluidizers. It should of course be noted that component (1) (paint base component) and component (2) (curing component) are produced and stored separately from one another and, as described above, are combined and mixed only briefly prior to application of the coating composition to a substrate. It should likewise be ensured that the paint base component (1) contains or consists of a dispersion as described above. What this means is that the production of the 2K coating composition at least includes the production of such a dispersion.

The present invention further provides a process for producing a coating on a substrate, in which the coating composition of the invention is applied to a substrate and then a coating film is formed. It will be appreciated that, in the context of the process of the invention in which the coating composition is used, the above-described particular and preferred embodiments with regard to the coating composition are likewise applicable.

The application of the coating composition of the invention to a substrate can especially be effected in the layer thicknesses that are customary in the vehicle industry in the range, for example, from 5 to 200 micrometers, preferably 10 to 150 micrometers, more preferably 30 to 70 micrometers. The stated layer thicknesses should be regarded as dry film layer thicknesses after the curing described below. For example, the known methods are employed here, such as spraying, knife-coating, painting, pouring, dipping, impregnating, trickling or rolling. Preference is given to employing spraying methods.

After the composition of the invention has been applied, a polymer film or cured coating film is formed therefrom. The composition applied is thus cured by known methods. The curing is effected at temperatures of, for example, 15 to 120° C., especially 20 to 80° C., most preferably of 20 to 65° C. These preferred comparatively low curing temperatures result particularly from the fact that the coating composition is a (2K) coating composition, in the case of which, in particular, only low curing temperatures are needed for the thermal crosslinking. The duration of the curing may vary significantly in the individual case and is, for example, between 5 min and 16 hours, preferably 20 min to 80 min. These preferred comparatively short curing times result particularly from the fact that the composition of the invention requires only comparatively short curing times at temperatures that are nevertheless comparatively low in order nevertheless to have sufficient hardness that enables the sanding of the cured coating. A curing operation which is very particularly preferred in this respect is effected at 40 to 65° C. for 20 to 80 minutes.

The curing in the individual case may optionally be preceded by flashing-off, for example at room temperature (about 15 and 25° C.) for, for example, 1 to 60 min. Flash-off for the purposes of the present invention means evaporation of organic solvents and/or water, whereby the coating material dries but is as yet not fully cured, and what is not formed is in particular a completely crosslinked paint film.

The curing then affords the coated substrate of the invention, which likewise forms part of the subject matter of the present invention. The present invention also provides a coating produced from the composition.

Substrates used are, for example, metallic substrates, preferably those as used within the automotive industry (vehicle manufacture). Advantageously, unalloyed and alloyed steels and/or iron, zinc and aluminum substrates and corresponding alloys are used.

If it is stated above that the composition is applied to a substrate, this of course, however, does not mean that the composition must be applied directly to a metallic substrate. Instead, there may be at least one further layer between the metallic substrate and the layer formed by the composition. This is the case, for example, when the coating composition is used as surfacer in OEM finishing. This is because, in such a case, there will be at least one electrocoat layer between the surfacer layer and the metallic substrate. In other words, the substrate to which the composition of the invention is applied is thus a metal substrate coated with an electrocoat layer.

As already indicated above, the coating composition of the invention, however, is particularly advantageously usable as primer-surfacer in the refinishing sector, especially automotive refinishing, and in that case has properties such as good adhesion, corrosion protection and sandability after only brief curing at moderate temperatures.

Accordingly, in particular embodiments of the present invention, the substrates are already fully painted metallic substrates, especially those painted with multicoat automotive paint systems, in which the respective multiple coating has local damage (defects). More particularly, these are thus automotive bodywork or parts thereof that have damage, for example stonechip damage and the like. In the damaged regions, the original multilayer coating has thus been at least partly detached by outside action. The coating composition of the invention is then used in the repair of these damaged areas, i.e. the refinishing, as primer-surfacer. In general, in the refinishing operation, the application of the primer is preceded by cleaning and sanding of the damaged originally coated substrate. This removes any only insufficiently adhering and partly detached areas of the original coating that are present and/or corrosion products that have already formed and especially also locally exposes the metallic substrate. This is thus a complex substrate surface having a wide variety of different interfaces. One interface here is that with the completely exposed metallic substrate. Further interfaces and edges can be found in the region between the damaged, cleaned and sanded sites and the areas surrounding these sites with intact original paint system. At all these interfaces, one and the same coating composition has to assure adequate adhesion. Thus, the composition of the invention offers great advantages since, even in this demanding area, excellent adhesion, corrosion resistance and sandability are nevertheless obtained.

In preferred embodiments of the invention, after the production of a cured coating from the composition of the invention, especially of a surfacer or primer-surfacer layer, further coating compositions are applied and a multicoat paint system is formed. These further coating compositions are especially standard basecoats and clearcoats.

The invention is to be elucidated hereinafter by examples.

EXAMPLES

Methods of Determination

Proportion of Monomeric Amines in Aqueous Dispersions

The determination is effected by gas chromatography to DIN 51 405:

The samples are injected directly into the split injector of a gas chromatograph with a flame ionization detector and separated both on a column with polar phase (polyethylene glycol; 50 m fused silica capillary column with polyethylene glycol phase) and on a nonpolar column (polydimethylsiloxane; 50 m fused silica capillary column with polydimethylsiloxane phase). Evaluation is effected by the ISTD % method.

About 100-500 mg of sample (according to amine content) are weighed accurately to 0.1 mg into a 5 mL snaplid bottle on an analytical balance. About 5% ISTD diethylene glycol dimethyl ether are weighed accurately to 0.1 mg into the sample. The samples are diluted with 5 mL of THF. (Should the sample not dissolve in THF, a suitable solvent has to be found by experiments.)

The sample thus prepared is analyzed on an Agilent 7890 gas chromatograph. Injection is effected by means of an automatic sampler.

Gas Chromatography Conditions:

Oven program: 40° C. (hold time 5 min) (3°/min)→100° C. (10°/min)→230° C. (hold time 5 min)

Carrier gas: Hydrogen

Separating columns: Agilent Innowax: length 50 m, film thickness 0.2 µm, diameter 0.2 mm, pressure 1.0 bar HP-1, length 50 m, film thickness 0.33 µm, diameter 0.2 mm, pressure 1.3 bar Injector temperature: 250° C. (lower if required)

Amount injected: 0.3 µL (manual injection 0.3-0.6 µL)

Detector: flame ionization detector

Detector temperature: 275° C.

Split flow: 15 mL/minute

The amines are identified by retention times on the polar and nonpolar column (see comparative chromatograms). For unknown components, a GC/MS analysis has to be conducted.

The amines detected and the internal standard are weighed accurately to 0.1 mg in accordance with the approximate ratios in the sample on an analytical balance. The concentration of the amines in the overall calibration solution was to correspond to that of the amines in the sample prepared (the concentrations of the amines are calculated by the GC analyzer program). Subsequently, the calibration solution is analyzed under the same conditions as the sample and the substance-specific correction factors are ascertained.

The amine contents of the sample are calculated with the aid of the GC analyzer program by the ISTD % method.

Epoxy Equivalent Weight

The determination was effected to DIN EN ISO 3001.

Solids Content (Nonvolatile Component)

Unless stated otherwise, the solids content (also called proportion of solids, solid-state content, proportion of nonvolatiles) was determined to DIN EN ISO 3251 at 130° C.; 60 min, starting weight 1.0 g.

Proportion of Polymeric Organic Amines (Polyamines) in Aqueous Dispersions

The determination was effected analogously to the determination of the solids content, except that the sample was kept at 130° C. for 8 hours (rather than 60 min). In this way, it is assured that the proportion of any nonvolatile monomeric amines (M) remaining is negligibly small and the measurement result corresponds to the parameter assigned to the result.

Proportion of Resin Mixture (I) or Resin Component in an Aqueous Dispersion

The proportion is found from the sum total of the proportion of monomeric amines and the proportion of polyamines in aqueous dispersions.

Proportion of Monomeric Amines or Polyamines in the Resin Mixture (I) or the Resin Component (R)

The proportion of monomeric amines in the resin mixture (I) or of the resin component (R) is found from the proportion of monomeric amines in an aqueous dispersion divided by the sum total of the proportion of monomeric amines and the proportion of polyamines in this aqueous dispersion. The proportion of the polyamines is determined in a corresponding manner.

N—H Equivalent

The N—H equivalent of the resin component (R) and of the resin mixture (I) are determined in the consecutive manner which follows.

a)

First of all, the N—H equivalent of the resin mixture (I) present in aqueous dispersion is determined. For this purpose, first of all, the different proportions by mass of primary and secondary amino groups (each as % nitrogen) in the aqueous dispersion is determined to DIN EN ISO 9702 (October 1998) by the method for aliphatic amines. The proportions by mass obtained are then used to obtain the molar amount of N—H functions in 100 g of the aqueous dispersion by the following calculation:

$n$(N—H)=($m$(N from primary amino groups)/(14 g/mol))*2+$m$(N from secondary amino groups)/(14 g/mol) (where "$m$" represents the proportion by mass measured in each case).

The molar amount of N—H functions and the mass of sample (100 g) ultimately lead to the N—H equivalent of the sample (aqueous dispersion), i.e. the mass of the sample in which there is 1 mol of N—H functions.

Via the determination of the proportion of the resin mixture of the sample, the N—H equivalent of the resin mixture (I) can then be calculated:

(N—H equivalent(resin mixture (I))=N—H equivalent(sample)*proportion(resin mixture in sample))

The proportion of the resin mixture in the sample is found as the sum total of proportion of the polyamine and the proportion of monomeric amines (see above).

b)

The N—H equivalent of the resin component (R) is then calculated from the previously determined N—H equivalent of the resin mixture (I), the mass of the resin mixture (I) used in stage (B), the mass of component (IIb) used in stage (II), and the molar amount of epoxy groups used in component (IIb) (determined via the mass of component (IIb) used and the epoxy equivalent weight). This assumes a quantitative reaction of the epoxy groups with the N—H functions. The total mass of resin component (R) is obtained by addition of the mass of resin mixture (I) used and the mass of component (IIb) used.

Determination of the Storage Stability of the Paint Base

The flow time in seconds for the ready-for-use primer-surfacer (paint base, curing agent and water) is measured by means of DIN 4 cups to DIN 532111 (1987-06-00). Thirty minutes after the components have been mixed and 60 minutes after the components have been mixed, the flow time is determined again. These three values in seconds are measured on the freshly produced material (no earlier than 24 h after production of the paint base in the bead mill and from the mixing of the curing components). Subsequently, samples of the paint base are stored at 40° C. and, after 8 weeks, the flow times of the finished surfacer are measured again, and after 30 and 60 min. For this purpose, fresh curing agent samples are made up since it is the storage stability of the paint base that is to be tested. If the flow time values for the ready-for-use samples composed of fresh paint base and fresh curing agent differ from the flow time values for the ready-for-use samples of aged paint base with fresh curing agent by less than 5 seconds, the paint base is classified as storage-stable.

Glass Transition Temperature

Glass transition temperature Tg in the context of the invention is determined experimentally in a method based on DIN 51005 "Thermal analysis (TA)—terms" and DIN 53765 "Thermal analysis—dynamic scanning calorimetry (DSC)". Here, a sample of 10 mg is weighed out into a sample boat and inserted into a DSC instrument. Cooling takes place to the start temperature, and subsequently 1st and 2nd measuring runs are carried out with inert gas purging (N2) of 50 mL/min with a heating rate of 10 K/min, with cooling back down to the start temperature between the measuring runs. The measurement takes place customarily in the temperature range from about 50° C. lower than the expected glass transition temperature to about 50° C. higher than the glass transition temperature. The glass transition temperature in the context of the present invention and in accordance with DIN 53765, section 8.1, is that temperature in the 2nd measuring run at which half the change in the specific heat capacity is reached (0.5 delta cp). It is ascertained from the DSC diagram (plot of heat flow against temperature) and is the temperature of the point of intersection of the center line between the extrapolated baselines before and after the glass transition with the measurement curve.

Maximum Sedimentation Rate

The method serves to characterize the sedimentation process of a dispersed material. For this purpose, the sample is accelerated in an optical cuvette centrifuge and thus experiences a centrifugal force. The effect of this is separation of the dispersed sample constituents in accordance with their density. This separation process can be followed along a cuvette as a function of time. The resulting rate profiles characterize the mechanism of sedimentation (when the density of the dispersed particles is greater than that of the surrounding dispersant) or of creaming (when the density of the dispersed particles is less than that of the surrounding dispersant).

In the case of sedimentation, the rate at which the phase boundary between sediment and clear supernatant changes position can serve as a quantification of the sedimentation process: A sample wherein the position of the phase boundary barely changes within a given time has much greater sedimentation stability than a sample where the phase boundary undergoes distinct movement within the same period of time.

Since the sample has still not been subjected to any centrifugal force prior to commencement of the measurement, and therefore the homogeneity of the sample is at the maximum possible level, the sedimentation rate will be at its highest directly on commencement of or at least within the initial period of measurement and will then drop gradually.

The actual measurements proceed as follows: First of all, a sample of the epoxy resin to be analyzed is adjusted to a solids content of 30% with water. Then the sample is analyzed in an optical cuvette centrifuge (LUMiSizer 651) with regard to sedimentation rates over a period of 6 hours and the maximum sedimentation rate within this period is evaluated (PA cuvettes with optical path length 2 mm, measurement temperature 25° C., wavelength 870 nm, 2050 g). Experience has shown that the maximum sedimentation rate occurs within the first 0.5 to 1.5 hours, while sedimentation stops virtually or completely after a period of 4 to 6 hours.

Polyamine Components for Use in Coating Compositions

Aqueous Dispersion (AD1)

683.00 g of Beckopox VEH 2849W (aqueous dispersion of a resin mixture (I), where the resin mixture contains 27.5% by weight of monomeric amines (isophoronediamine and xylylenediamine) and 72.5% by weight of polyamine and additionally has an NH equivalent of 108 g/mol) and 1663.77 g of demineralized water are combined in a reaction vessel, stirred continuously and kept at 95° C. for 1 hour. Subsequently, the mixture is cooled to 70° C. and a mixture of 163.44 g of bisphenol A diglycidyl ether-based epoxy resin having an average epoxy equivalent weight of 186.5 g/mol, 39.46 g of polyalkylene polyether epoxide based on polypropylene oxide having an average epoxy equivalent weight of 395 g/mol, 81.96 g of ethoxypropanol; 81.47 g of methyl ethyl ketone and 81.72 g of isobutanol is metered in continuously while stirring over a period of 4 hours, and the mixture is kept at 70° C. for a further 1 hour. The reaction product thus obtained is cooled down to 45° C. The viscosity of the product is 150-250 mPas at 25° C.

In a subsequent process step, the process solvents isobutanol and methyl ethyl ketone are removed from the product by distillation under reduced pressure. The resulting aqueous dispersion (AD1) has a residual content of isobutanol and methyl ethyl ketone of <0.5% (gas chromatography).

The content of resin component (R) in the aqueous dispersion is 33.4% by weight (2.4% by weight of monomeric amine, 31% of polyamine). The resin component thus has a content of 7.2% by weight of monomeric amine (M). The resin component additionally has an amine equivalent weight (N—H equivalent weight) of 171 g/mol.

Aqueous Dispersion (AD2)

683.00 g of Beckopox VEH 2849W (aqueous dispersion of a resin mixture (I), where the resin mixture contains 27.5% by weight of monomeric amines (isophoronediamine and xylylenediamine) and 72.5% by weight of polyamine and additionally has an NH equivalent of 108 g/mol), 266.11 g of methyl ethyl ketone and 1395.96 g of (demineralized) water are combined in a reaction vessel, stirred continuously and kept at 70° C. for 1 hour. Subsequently, a mixture of 163.44 g of bisphenol A diglycidyl ether-based epoxy resin having an average epoxy equivalent weight of 186.5 g/mol, 39.46 g of polyalkylene polyether epoxide based on polypropylene oxide having an average epoxy equivalent weight of 395 g/mol, 81.96 g of ethoxypropanol; 81.47 g of methyl ethyl ketone and 81.72 g of isobutanol is metered in continuously while stirring over a period of 4 hours, and the mixture is kept at 70° C. for a further 1 hour. The reaction product thus obtained is cooled down to 45° C. The viscosity of the product is 150-250 mPas at 25° C.

In a subsequent process step, the process solvents isobutanol and methyl ethyl ketone are removed from the product by distillation under reduced pressure. The resulting aqueous dispersion (AD2) has a residual content of isobutanol and methyl ethyl ketone of <0.5% (gas chromatography).

The content of resin component (R) in the aqueous dispersion is 33% by weight (2.4% by weight of monomeric amine, 31% of polyamine). The resin component thus has a content of 7.2% by weight of monomeric amine (M). The resin component additionally has an amine equivalent weight (N—H equivalent weight) of 171 g/mol.

Aqueous Dispersion (AD3)

Stage (A)

1000 g of polyalkylene polyether monoamine based on propylene oxide/ethylene oxide having an average molecular weight of 2000 g/mol (Jeffamine M2070, a primary amine function (=2 NH functions)) and 448.8 g of bisphenol A diglycidyl ether-based epoxy resin having an average epoxy equivalent weight of 186.5 g/mol are mixed in a reaction vessel and then the internal temperature is kept at 130° C. for 1 hour and at 80-90° C. for a further 2 hours. The product thus obtained has an epoxy equivalent weight of 1035 g/mol. The viscosity of the product is 6734 mPas at 23° C. 96.43 g of the reaction product thus obtained are mixed in a reaction vessel with 33.9 g of isophoronediamine and 27.12 g of m-xylylenediamine, then the internal temperature is kept at 60° C. for 1 hour and at 80-90° C. for a further 2 hours. After cooling to 50° C., it is diluted with water (solids content 80%). The resin mixture (I) present in the dispersion has an amine equivalent weight (N—H equivalent weight) of 105 g/mol. The viscosity of the product is 1540 mPas at 23° C.

Stage (B)

683.00 g of the reaction product from stage (A) and 1663.768 g of (demineralized) water are combined in a reaction vessel, stirred continuously and kept at 95° C. for 1 hour. Subsequently, the mixture is cooled to 70° C. and a mixture of 163.44 g of bisphenol A diglycidyl ether-based epoxy resin having an average epoxy equivalent weight of 186.5 g/mol, 39.46 g of polyalkylene polyether epoxide based on polypropylene oxide having an average epoxy equivalent weight of 395 g/mol, 81.96 g of ethoxypropanol; 81.47 g of methyl ethyl ketone and 81.72 g of isobutanol is metered in continuously while stirring over a period of 4 hours, and the mixture is kept at about 70° C. for a further 1 hour. The reaction product thus obtained is cooled down to 45° C. The viscosity of the product is 150-250 mPas at 25° C.

In a subsequent process step, the process solvents isobutanol and methyl ethyl ketone are removed from the product by distillation under reduced pressure. The resulting aqueous dispersion (AD3) has a residual content of isobutanol and methyl ethyl ketone of <0.5% (gas chromatography). The resin component has an amine equivalent weight (N—H equivalent weight) of 177 g/mol.

Further Aqueous Dispersion Containing a Polyamine Component X2

1200 g (1.2 mol or 2.4 OH equivalents) of polyalkylene polyether based on ethylene oxide having an average molecular weight of 1200 g/mol and 1984.62 g (10.67 epoxy equivalents) of bisphenol A diglycidyl ether-based epoxy resin having an average epoxy equivalent weight of 186.5 g/mol are mixed in a reaction vessel and then the internal temperature is increased to 120-130° C. with continuous stirring. Subsequently, 6.5 g of Anchor 1040 (BF3-monoethylamine catalyst) are added and the temperature is increased further to 160° C. and kept at 160° C. for a further 4 h until the epoxy equivalent weight reaches 417 g/mol. This is followed by cooling to 55° C. and adding of 82.549 g of di-n-propylamine. Stirring is continued at 55° C. until the EEW reaches 482 g/mol. This is followed by heating to 60° C. and adding of a further 174.11 g of (demineralized) water.

1605.22 g of isophoronediamine (corresponding to 9.4 mol or 37.77 NH equivalents) and 575.96 g of m-xylylenediamine (corresponding to 4.2 mol or 16.91 NH equivalents)

are mixed in a reactor and heated to an internal temperature of 60° C. Subsequently, over a period of 30 min, 3447.78 g of the above reaction product are added with continuous mixing. This increases the internal temperature to about 75° C., and stirring is continued at this temperature for 90 min. Thereafter, n-butyl glycidyl ether is added with stirring over the course of 20 min. This increases the internal temperature to about 80° C., and stirring is continued at this temperature for 60 min. Thereafter, a further 1374 g of (demineralized) water are added and this cools the product to 40° C.

The resin mixture present in the reaction mixture has an amine equivalent weight (N—H equivalent weight) of 125 g/mol.

Further Aqueous Dispersion Containing a Polyamine Component X3

897.41 g of c(AD2) and 1868.00 g of demineralized water are heated to 95° C. in a reactor while stirring. This is followed by cooling to 70° C., and a mixture of 163.44 g (0.437 mol) of bisphenol A diglycidyl ether-based epoxy resin having an average epoxy equivalent weight of 186.5 g/mol, 39.46 g of polyalkylene polyether epoxide based on polypropylene oxide having an average epoxy equivalent weight of 395 g/mol, 81.96 g of ethoxypropanol; 81.47 g of methyl ethyl ketone and 81.72 g of isobutanol is metered in over a period of 2 hours, and the mixture is kept at about 70° C. for a further 1 hour.

The reaction product thus obtained is cooled down to 45° C. The viscosity of the product is 150-500 mPas at 25° C.

In a subsequent process step, the process solvents isobutanol and methyl ethyl ketone are removed from the product by distillation under reduced pressure. The resulting aqueous dispersion has a residual content of isobutanol and methyl ethyl ketone of <0.5%.

The resin mixture present in the dispersion has an amine equivalent weight (N—H equivalent weight) of 203 g/mol.

Further Aqueous Dispersion Containing a Polyamine Component X6

Dispersion X6 was produced analogously to stage (A) of dispersion (AD3), except using exclusively m-xylylenediamine rather than a mixture of isophoronediamine and m-xylylenediamine. The proportion of m-xylylenediamine was correspondingly increased in order to ensure that the same molar amount of monomeric amine was used.

The resin mixture present in the dispersion has an amine equivalent weight (N—H equivalent weight) of 100 g/mol.

Table A gives another overview of the aqueous dispersions comprising polyamine components produced. Additionally listed are commercially purchased further dispersions that are additionally used in aqueous coating compositions (see below).

TABLE A

| Aqueous dispersions | |
|---|---|
| (AD1) | See synthesis above |
| (AD2) | See synthesis above |
| (AD3) | See synthesis above |
| X1 | Beckopox VEH 2849W |
| X2 | See synthesis above |
| X3 | See synthesis above |
| X4 | Beckopox EH 613 (N—H equivalent (resin) = 116 g/mol) |
| X5 | Beckopox EH 623w (N—H equivalent (resin) = 160 g/mol), contains acrylonitrile in the amine component |
| X6 | See synthesis above |

Epoxy Resins for Use in Coating Compositions

The epoxy resins shown in table A1 were used as described further down for production of coating compositions.

TABLE A1

| Epoxy resin | EEW [g/mol] | Maximum sedimentation rate [micrometers/hour] | Tg [° C.] |
|---|---|---|---|
| D.E.R. 917 (Olin Corporation/BLUE CUBE GERMANY ASSETS GMBH & Co. KG)) | 198.5 | 15300 | −18 |
| EPOTEC Resin TW 5001 (ADITYA BIRLA Chemical Thailand Ltd.) | 207.5 | 4900 | −20 |
| KWER 828-70 (KUMHO P&B CHEMICALS, Korea) | 202.5 | 21500 | −19 |
| EPI-REZ 7510-W-60 (Hexion) | 200 | 36500 | −20 |
| EPI-REZ 5108 (Hexion) | 230 | 26900 | 17 |
| Beckopox EP 384w/53WAMP (Allnex) | 520 | 11300 | 23 |
| Beckopox EP 2384w/57WA (Allnex) | 450 | 15600 | 10 |
| Beckopox EP 385w/56WA (Allnex) | 500 | 5900 | 3 |
| Beckopox EP 2340w/56WA (Allnex) | 240 | 18700 | −16 |

The data shown in table 1A show that only the epoxy resins D.E.R. 917, EPOTEC Resin TW 5001, EPI-REZ 5108 and Beckopox EP 2384w/57WA are epoxy resins for use in accordance with the invention.

Inventive Coating Compositions and Comparative Coating Compositions

Different inventive and comparative coating compositions were produced by the general production method that follows.

The paint base component (1) and curing component (2) of a coating composition were produced by combining the respective constituents and intimate mixing. In the production of the paint base component (1), an aqueous dispersion was produced using all or virtually all the individual constituents of the paint base component for 30 min in each case in a bead mill, 2 cups containing 350 mL of beads (Silibeads Z with diameter 1.6 to 2.5 mm) for 2100 g of millbase with a uniform rotation rate. The constituents and their amounts can be found in tables B to D below.

For production of the coating compositions as such, the paint base components were each mixed with the curing components and optionally further water. The compositions were used as described below within one hour after completion, i.e. applied to a substrate and subsequently cured.

TABLE B

Coating compositions with paint base components comprising polyamine components

| Constituent | Pts. by wt. | Pts. by wt. | Pts. by wt. | Pts. by wt. | Pts. by wt. | Pts. by wt. | Pts. by wt. |
|---|---|---|---|---|---|---|---|
| Paint base components | V1 | V2 | V3 | V4 | V5 | V6 | V7 |
| (AD2) | 42.75 | 48.80 | | 47.00 | | | 48.8 |
| X1 | | | 50.00 | | | | |
| X5 | | | | | 16.80 | | |
| X4 | | | | | | 16.00 | |
| Disperbyk 2012 | 1.00 | | | | | | |
| Disperbyk 199 | | 1.00 | 1.00 | 1.50 | 1.50 | 1.50 | 1.0 |
| AEROSIL R 972 | 1.00 | | | | | | |
| BYK 011, 29% | | 0.30 | 0.30 | 0.60 | 0.60 | 0.60 | 0.3 |
| BYK-023, 18% | 0.25 | | | | | | |
| TR81 RUTILE TITANIUM | 13.20 | 13.30 | 13.30 | 13.20 | 12.00 | 12.00 | 13.3 |
| SILFIT Z 91 | | 7.90 | 7.90 | | | | 7.7 |
| FINNTALC M 30 TALC | 9.50 | | | | | | |
| MICRO TALC IT EXTRA | | 7.10 | 7.00 | 9.50 | 8.00 | 8.00 | 7.1 |
| ASP 600 ALUMINUM SILICATE | 14.60 | 7.50 | 7.60 | 14.60 | 11.00 | 11.00 | 7.6 |
| LF BOWSEI MP-620 | 1.50 | 1.50 | 1.50 | 1.50 | 1.50 | 1.50 | 1.5 |
| BLANC FIXE N | 7.60 | 4.00 | 4.00 | 7.60 | 7.00 | 7.00 | 4.0 |
| NOVACITE L-207 A | | 2.00 | 2.00 | | | | 2.0 |
| BYK-346 | 1.00 | | | | | | |
| BYK-348 | | 0.10 | 0.10 | 0.10 | 0.10 | 0.10 | 0.1 |
| Halox 570 | | 0.50 | 0.50 | 0.50 | 0.50 | 0.50 | 0.5 |
| Water | 7.60 | 6.00 | 9.80 | 3.90 | 41.00 | 41.80 | 6.0 |
| Total | 100 | 100 | 105 | 100 | 100 | 100 | 100 |
| Curing components | V1 | V2 | V3 | V4 | V5 | V6 | V7 |
| Epikote 828 (epoxy resin with an EEW of 185 g/mol, from Momentive, solvent-free, non-water-dispersible) | 14.04 | 15.91 | 27.38 | 16.38 | 14.4 | 21.8 | |
| BUTYL ACETATE 98-100% | 9.16 | | | | | | |
| METHYL ISOAMYL KETONE (MIAK) | | 2.72 | 4.68 | 2.8 | 2.5 | 3.7 | |
| BUTYL GLYCOL ACETATE | | 7.66 | 13.17 | 7.882 | 6.9 | 10.5 | |
| SILQUEST A-187 | 0.80 | 0.91 | 1.57 | 0.94 | 0.8 | 1.2 | |
| BECKOPDX EP 2384 | | | | | | | 67.7 |
| Water, demineralized | | | | | | | 26.3 |
| Total curing agents | 24.00 | 27.20 | 46.80 | 28 | 24.6 | 37.3 | 94.0 |
| Added water | V1 | V2 | V3 | V4 | V5 | V6 | V7 |
| Water | 15.5 | 12.0 | 16.0 | 17.0 | 6.5 | 13.0 | 0.0 |
| Indices | V1 | V2 | V3 | V4 | V5 | V6 | V7 |
| Pigment to binder ratio (P/B) | 1.6 | 1.4 | 1.0 | 1.4 | 1.4 | 1.1 | 0.8 |
| DIN4 flow time in s | 19 | 20 | 20 | 20 | 20 | 20 | 23 |

TABLE C

Coating compositions with paint base components comprising epoxy resins

| Constituent | Pts. by wt. | Pts. by wt. | Pts. by wt. | Pts. by wt. | Pts. by wt. | Pts. by wt. | Pts. by wt. |
|---|---|---|---|---|---|---|---|
| Paint base components | E1 | E2 | E3 | E4 | E5 | E6 | E7 |
| D.E.R. 917 Epoxy Resin | 33.20 | 33.20 | 33.20 | 33.20 | 33.20 | 33.20 | 33.20 |
| Water | 15.00 | 15.00 | 15.00 | 15.00 | 15.00 | 15.00 | 15.00 |
| Disperbyk 199 | 2.00 | 2.00 | 2.00 | 2.00 | 2.00 | 2.00 | 2.00 |
| BYK 011, 29% | 0.30 | 0.30 | 0.30 | 0.30 | 0.30 | 0.30 | 0.30 |
| TR81 RUTILE TITANIUM | 12.90 | 12.90 | 12.90 | 12.90 | 12.90 | 12.90 | 12.90 |
| MICRO TALC IT EXTRA | 12.50 | 12.50 | 12.50 | 12.50 | 12.50 | 12.50 | 12.50 |
| ASP 600 ALUMINUM SILICATE | 9.80 | 9.80 | 9.80 | 9.80 | 9.80 | 9.80 | 9.80 |
| BLANC FIXE N | 4.40 | 4.40 | 4.40 | 4.40 | 4.40 | 4.40 | 4.40 |
| LF BOWSEI MP-620 | 1.50 | 1.50 | 1.50 | 1.50 | 1.50 | 1.50 | 1.50 |
| NOVACITE L-207 A | 2.00 | 2.00 | 2.00 | 2.00 | 2.00 | 2.00 | 2.00 |
| Water | 5.00 | 5.00 | 5.00 | 5.00 | 5.00 | 5.00 | 5.00 |
| Completion downstream of mill | | | | | | | |

TABLE C-continued

Coating compositions with paint base components comprising epoxy resins

| Constituent | Pts. by wt. | Pts. by wt. | Pts. by wt. | Pts. by wt. | Pts. by wt. | Pts. by wt. | Pts. by wt. |
|---|---|---|---|---|---|---|---|
| BYK 333 | 0.50 | 0.50 | 0.50 | 0.50 | 0.50 | 0.50 | 0.50 |
| Water | 0.90 | 0.90 | 0.90 | 0.90 | 0.90 | 0.90 | 0.90 |
| Total | 100 | 100 | 105 | 100 | 100 | 100 | 100 |
| Curing components | E1 | E2 | E3 | E4 | E5 | E6 | E7 |
| (AD1) | 54.81 | | | | | | |
| (AD2) | | 56.81 | | | | | |
| (AD3) | | | | | 65.38 | | |
| X6 | | | 31.35 | | | | |
| X1 | | | | 33.09 | | | |
| X2 | | | | | | 19.31 | |
| X3 | | | | | | | 62.81 |
| BUTYLGLYCOL | 1.22 | 1.21 | 0.69 | 0.72 | 1.21 | 0.95 | 1.58 |
| Halox 570 | 0.60 | 0.61 | 0.34 | 0.36 | 0.61 | 0.47 | 0.79 |
| Water | 4.26 | 1.97 | 1.92 | 2.03 | | 26.67 | 13.83 |
| Total curing agents | 60.9 | 60.6 | 34.3 | 36.2 | 67.2 | 47.4 | 79.0 |
| Added water | E1 | E2 | E3 | E4 | E5 | E6 | E7 |
| Water | 0 | 0 | 11 | 5 | 0 | 2 | 0 |
| Indices | E1 | E2 | E3 | E4 | E5 | E6 | E7 |
| Pigment to binder ratio (P/B) | 1.1 | 1.1 | 1.4 | 1.4 | 1.1 | 1.2 | 1.0 |
| DIN4 flow time in s | 24 | 24 | 24 | 24 | 26 | 24 | 16 |

N.B. All paint base components, after production (i.e. after the dispersion process), had good storage stability (testing of sediment and change in flow time in DIN cup after storage at 40° C. for 8 weeks, see above for test method). The cleaning of the bead mill was possible without difficulty by rinsing with water.

TABLE D

Further coating compositions with paint base components comprising epoxy resins

| Constituent | Pts. by wt. | Pts. by wt. | Pts. by wt. | Pts. by wt. | Pts. by wt. | Pts. by wt. | Pts. by wt. | Pts. by wt. | Pts. by wt. | Pts. by wt. | Pts. by wt. |
|---|---|---|---|---|---|---|---|---|---|---|---|
| Paint base components | E8 | V8 | V9 | E9 | V10 | V11 | E10 | V12 | E11 | V13 | V14 |
| D.E.R. 917 Epoxy Resin | 33.00 | | | | | | | | | | |
| EPI-REZ 7510-W-60 | | 34.10 | | | | | | | | | |
| KWER828-70, Epoxy Resin from Kumho P&B Chemicals, SC: 70% | | | 30.20 | | | | | | | | |
| TW5001, Epoxy Resin from epotec, SC: 59.32% | | | | 35.60 | | | | | | | |
| BECKOPDX EP 385 W, 56 % W | | | | | 36.00 | | | | | | |
| BECKOPDX EP 2340W/56WA | | | | | | 36.00 | | | | | |
| EPI-REZ 5108 | | | | | | | 34.10 | | | | |
| Beckopox EP 384 | | | | | | | | 39.800 | | | |
| Beckopox EP 2384 | | | | | | | | | 37.1 | | |
| ZQ744313 (mod. polyamine) | | | | | | | | | | 46 | 46 |
| WATER, DEMINERALIZED | 11.00 | 9.90 | 13.80 | 8.40 | 10.00 | 10.00 | 9.9 | 4.2 | 6.90 | | |
| ADDITOL VXW 6208 | 1.00 | 1.00 | 1.00 | 1.00 | 1.00 | 1.00 | 1.0 | 1.0 | 1.0 | 1.00 | 1.00 |
| BYK 011, 29% | 0.60 | 0.60 | 0.60 | 0.60 | 0.60 | 0.60 | 0.6 | 0.6 | 0.6 | 0.60 | 0.60 |
| TEXANOL | 0.50 | 0.50 | 0.50 | 0.50 | 0.50 | 0.50 | 0.5 | 0.5 | 0.5 | 0.50 | 0.50 |
| MICRO TALC IT EXTRA | 5.00 | 5.00 | 5.00 | 5.00 | 5.00 | 5.00 | 5.00 | 5.00 | 5.00 | 5.00 | 5.00 |
| TR81 RUTILE TITANIUM | 16.00 | 16.00 | 16.00 | 16.00 | 15.00 | 15.00 | 16.00 | 16.00 | 16.00 | 15.00 | 15.00 |
| TREMIN 283-600 EST Wollastonite AS | 8.00 | 8.00 | 8.00 | 8.00 | 8.00 | 8.00 | 8.00 | 8.00 | 8.00 | | |
| BLANC FIXE N | 8.00 | 8.00 | 8.00 | 8.00 | 8.00 | 8.00 | 8.00 | 8.00 | 8.00 | 8.00 | 8.00 |
| LF BOWSEI MP-620 | 1.50 | 1.50 | 1.50 | 1.50 | 1.50 | 1.50 | 1.50 | 1.50 | 1.50 | 1.50 | 1.50 |
| NOVACITE L-207 A | 3.00 | 3.00 | 3.00 | 3.00 | 3.00 | 3.00 | 3.00 | 3.00 | 3.00 | 3.00 | 3.00 |
| ZINC PHOSPHATE PZ 20 | 9.00 | 9.00 | 9.00 | 9.00 | 8.00 | 8.00 | 9.00 | 9.00 | 9.00 | 8.00 | 8.00 |
| HEUCORIN RZ | 0.50 | 0.50 | 0.50 | 0.50 | 0.50 | 0.50 | 0.50 | 0.50 | 0.50 | 0.50 | 0.50 |
| WATER, DEMINERALIZED | | | | | 1.00 | 1.00 | | | | 1.00 | 1.00 |

TABLE D-continued

Further coating compositions with paint base components comprising epoxy resins

| Constituent | Pts. by wt. | Pts. by wt. | Pts. by wt. | Pts. by wt. | Pts. by wt. | Pts. by wt. | Pts. by wt. | Pts. by wt. | Pts. by wt. | Pts. by wt. | Pts. by wt. |
|---|---|---|---|---|---|---|---|---|---|---|---|
| BYK-333, 100% | 0.50 | 0.50 | 0.50 | 0.50 | 0.50 | 0.50 | 0.50 | 0.50 | 0.50 | 0.50 | 0.50 |
| WATER, DEMINERALIZED | 2.40 | 2.40 | 2.40 | 2.40 | 1.40 | 1.40 | 2.40 | 2.40 | 2.40 | 1.40 | 1.40 |
| Total | | | | | | | | | | | |
| Curing components | E8 | V8 | V9 | E9 | V10 | V11 | E10 | V12 | E11 | V13 | V14 |
| ZQ744313 | 53.06 | 50.34 | 49.46 | 47.87 | — | 39.69 | 41.89 | — | 21.65 | | |
| BUTYLGLYCOL | 1.51 | 1.43 | 1.41 | 1.36 | — | 1.13 | 1.19 | — | 0.62 | 0.66 | |
| WATER, DEMINERALIZED | 5.73 | 5.43 | 5.34 | 5.17 | — | 4.28 | 4.52 | — | 2.34 | 2.5 | |
| D.E.R. 917 Epoxy Resin | | | | | | | | | | 23.14 | |
| EPDXY R. LIQ. LOW-CHLORINE | | | | | | | | | | | 16.79 |
| METHYL ISOAMYL KETONE (MIAK) | | | | | | | | | | | 2.87 |
| BUTYL GLYCOL ACETATE | | | | | | | | | | | 8.08 |
| SILQUEST A-187 | | | | | | | | | | | 0.96 |
| | 60.3 | 57.2 | 56.2 | 54.4 | — | 45.1 | 47.6 | — | 24.6 | 26.3 | 28.7 |
| Added water | E8 | V8 | V9 | E9 | V10 | V11 | E10 | V12 | E11 | V13 | V14 |
| Water | 1 | 10 | 0 | 6 | — | 3 | 10 | — | 16 | 10 | 20 |
| Indices | E8 | V8 | V9 | E9 | V10 | V11 | E10 | V12 | E11 | V13 | V14 |
| Pigment to binder ratio (P/B) ready-for-use | 1.4 | 1.4 | 1.4 | 1.4 | | 1.5 | 1.5 | | 1.8 | 1.7 | 1.6 |
| DIN4 flow time adjusted with water in s | 23 | 22 | 19 | 22 | — | 22 | 23 | — | 22 | 25 | 20 |

N.B. The paint base components of E8, V9, E9, E10 and V13 and V14, after production (i.e. after the dispersion process), had good storage stability (testing of sediment and change in flow time in DIN cup after storage at 40° C. for 8 weeks, see above for test method). The cleaning of the bead mill was possible without difficulty by rinsing with water. The paint base components of V8, V11 and E11 were likewise producible without difficulty via the use of the bead mill and were found to be storage-stable. After production, a slightly tacky film remained in the mill and on the surface of the mill beads, but was still removable. The paint base components V10 and V12 were not producible as a homogeneous dispersion, but degraded irreversibly in the course of the grinding process to give an inhomogeneous, tackified mixture. Further use thereof was impossible.

Production of Coatings Using the Coating Compositions

Using the coating compositions E1 to E11 and V1 to V14, multicoat paint systems were produced by the general method that follows.

First of all, the substrate is cleaned in accordance with its material type, i.e. metallic substrates with Glasurit 360-4 metal cleaner, plastic parts with Glasurit 541-30 universal cleaner for plastics, and old paints or works-primed new parts with Glasurit 541-5 KH silicone and tar remover.

This is followed by sanding according to the substrate: sheet steel with P80, galvanized sheet steel with abrasive pad, aluminum with P150, plastics with abrasive pad over their area, used paints or works-primed new parts with abrasive pad.

In the next step, the abrasive dust is removed by means of cleaner and dried. This is done using the same cleaner as before for each substrate. After rubbing dry, it is possible to commence primer-surfacer application.

For this purpose, the paint base and the curing component and the demineralized water, as described above, are mixed with a stirrer bar and then applied with a spraygun (SATA BF 100 RP 1.6 at 2.0 bar). Two full spraying runs are applied without intermediate flashoff. After the second spraying run, the primer-surfacer is dried at object temperature 60° C. for 40 min. The dry layer thickness was in each case between 60 and 80 micrometers (Dualscope MP40, ED10 probe from Fischer) to DIN EN ISO 2808 of May 2007.

The drying phase and subsequent cooling phase are followed by sanding. For this purpose, control black (09560 Black from 3M) is applied to the coated surface. An eccentric sanding tool (LEX3 from Festool) with stroke 5 mm and P400 abrasive paper (Standard from RODIM) is used to sand the surface flat.

This is followed by cleaning with Glasurit 700-1 cleaner and application of the basecoat.

For this purpose, Glasurit 90-1250 deep black is made up. The components are mixed with a stirrer bar and then applied with one of the approved paint guns (e.g. SATA 5000 HVLP 1.3 at 2.0 bar). Two concealing spray runs and one effect run are applied. Each spraying run is 35 followed by an intermediate or final flashoff for about 5 min until the surface has a matt appearance.

The layer thicknesses achieved were between 10 and 15 micrometers (Dualscope MP40, ED10 probe from Fischer) to DIN EN ISO 2808 of May 2007.

Clearcoat is applied as the last layer. For this purpose, Glasurit 923-630 HS clear superior gloss VOC is made up:

The components are mixed with a stirrer bar and then applied with one of the approved paint guns (e.g. SATA 5000 RP 1.3 at 2.0 bar). For this purpose, two spraying runs are applied with an intermediate flashoff of 3 min. The subsequent drying is effected at object temperature 60° C. for 30 min. Layer thicknesses in the region of 50-60 μm were achieved (Dualscope MP40, ED10 probe from Fischer) to DIN EN ISO 2808 of May 2007.

Properties and Examination of the Multilayer Paint Systems

All the paint systems produced were examined for their surface quality. The following measurements were conducted:

For quantification of the surface defects, the number of surface defects in a paint system was counted over an area as large as a DIN A4 page.

Table E shows the corresponding results.

TABLE E

| | E8 | V8 | V9 | E9 | V10 | V11 | E10 | V12 | E11 | V13 | V14 |
|---|---|---|---|---|---|---|---|---|---|---|---|
| Gloss at 20° in GU | 87 | — | 86 | 85 | — | — | 84 | — | 87 | 86 | 87 |
| Haze log | 4.0 | — | 4.0 | 4.3 | — | — | 5.0 | — | 3.7 | 4.3 | 3.7 |
| LW (long wave) | 2.0 | >10 | 10.3 | 2.6 | — | >10 | 2.7 | — | 1.3 | 1.7 | 1.2 |
| SW (short wave) | 15 | >50 | 51 | 25 | — | >50 | 9.4 | — | 11 | 10 | 12 |
| DOI (distinctness of image) | 94 | <80 | 79 | 91 | — | <80 | 95 | — | 96 | 95 | 95 |
| dullness | 1.7 | >20 | 20 | 1.8 | — | >20 | 1.0 | — | 1.0 | 1.4 | 1.0 |
| Visual topcoat condition (rank order: low values correspond to a good topcoat condition) | 2 | collapsed; barely evaluable | collapsed; barely evaluable | 4 | not painted | collapsed; barely evaluable | 4 | not painted | 3 | 1 | 1 |
| Number of surface defects, average over an area as large as a DIN A4 sheet | 31 | no evaluation | no evaluation | 0 | no evaluation | no evaluation | 11 | no evaluation | 0 | 183 | 177 |

Gloss and haze were measured with the Haze-Gloss instrument from BYK-Gardner. Gloss was measured at an angle of 20°. Haze was measured in accordance with DIN EN ISO 13803, February 2015 version: Paints and varnishes—Determination of haze on paint films at 20°. Gloss was measured in accordance with DIN EN ISO 2813; February 2015 version: Paints and varnishes—Determination of gloss value at 20°, 60° and 85°.

DOI (distinctness of image) and leveling were measured with the wave-scan dual instrument from BYK-Gardner on the painted sheets. The long wave (LVV) and the short wave (SVV) were determined.

The visual assessment of the paint condition was made under reproducible light conditions in front of a black background. The panel to be examined and the reference specimen or the panels to be compared with one another should be viewed at different angles in order to detect all surface defects and characteristics. The visual assessment of the paint condition can be conducted only relative to comparative specimens or standards. The result is a rank order. The clarity of the appearance of a concealingly painted surface is assessed. Differences in topcoat condition are attributable to fine structures that are reproduced from the substrate in the topcoat layer. The assessment is thus of the topcoat with regard to the concealing properties of the undercoat. "Collapse" of the basecoat leads to a downgrade with regard to the topcoat condition. Other surface defects such as craters, bubbles, pinholes, running, cloudiness etc. are registered separately and are not covered by the umbrella term of paint condition.

Moreover, the multilayer paint systems were examined visually for holes. For this purpose, the metal sheets were examined by microscope. It is found here that surface defects perceptible visually, i.e. by eye, under 10- or 20-fold magnification in thin section, are holes in the primer-surfacer layer that have been partly or completely filled with basecoat and/or clearcoat. Specifically, under a stereomicroscope, a scalpel was used to expose the fault center by multiple thin sections. Then slices of about 10 micrometers in thickness were cut off successively in the fault area and applied to microscope slides. For an assessment by light microscopy, a drop of immersion oil or glycerol was applied to the thin sections and covered with a coverslip.

The results show, by comparison with the coating compositions actually painted, that samples V8, V9 and V11 gave extremely poor topcoat conditions, and so—if they were evaluable at all by measurement techniques—resulted in correspondingly poor optical properties (DOI, LW, SW). The inventive systems E8-E11, by contrast, all had a good or at least still acceptable topcoat condition. Systems V13 and V14 (polyamine dispersion as paint base) had a good topcoat condition and, correspondingly, fundamentally good optical properties. However, systems V13 and V14, by comparison with the systems of the invention, showed an extremely high number of microscopic holes that are visually apparent as significant surface defects

The invention claimed is:

1. A process for repairing a multicoat paint system having defects, comprising applying a coating composition in the region of the defects, curing the coating composition to produce a cured coating layer and then sanding the cured coating layer, wherein the coating composition is an aqueous two-component coating composition comprising
    (1) an epoxy resin-based paint base component, and
    (2) a polyamine-based curing component,
    wherein the paint base component (1) comprises at least one aqueous dispersion of at least one pigment (P) and/or filler (F) in at least one epoxy resin (E),
    and wherein the at least one epoxy resin (E) has
        (i) a maximum sedimentation rate of not more than 17,500 micrometers per hour (measured in an optical cuvette centrifuge at an acceleration of 2050 g, solids diluted to 30% with water) and a glass transition temperature of less than 0° C. (measured by means of dynamic differential calorimetry, heating rate 10 K/min, 2nd measurement run), or
        (ii) a maximum sedimentation rate of at least 12,500 micrometers per hour and a glass transition temperature of at least 0° C.

2. The process as claimed in claim 1, wherein the curing is effected at a temperature of 20 to 80° C.

3. The process as claimed in claim 1, wherein, after the sanding of the cured coating layer, a multilayer paint system is produced by applying subsequently jointly or separately curing a basecoat and a clearcoat.

4. A coating produced by the process as claimed in claim 1.

* * * * *